United States Patent [19]

Furukawa

[11] Patent Number: 5,831,950
[45] Date of Patent: Nov. 3, 1998

[54] WRITING SYSTEM FOR A RECORDABLE COMPACT DISC STORING INFORMATION OF A WRITING OPERATION

[75] Inventor: Takahiro Furukawa, Kawasaki, Japan

[73] Assignee: Ricoh Company, Ltd., Tokyo, Japan

[21] Appl. No.: 716,605

[22] Filed: Sep. 19, 1996

[30] Foreign Application Priority Data

Sep. 26, 1995 [JP] Japan ................................. 7-273538

[51] Int. Cl.$^6$ ................................................ G06F 17/30
[52] U.S. Cl. ............................................. 369/47; 707/205
[58] Field of Search ............................ 369/47, 275.1, 369/32, 100; 711/112; 707/205

[56] References Cited

U.S. PATENT DOCUMENTS

| | | | |
|---|---|---|---|
| 5,058,096 | 10/1991 | Ando et al. | 369/100 |
| 5,124,963 | 6/1992 | Ando | 369/32 |
| 5,195,073 | 3/1993 | Kato et al. | 369/47 |
| 5,295,126 | 3/1994 | Okano et al. | 369/47 |
| 5,343,452 | 8/1994 | Maeda et al. | 369/32 |
| 5,351,226 | 9/1994 | Mizumoto et al. | 369/47 |
| 5,434,991 | 7/1995 | Maeda et al. | 711/112 |
| 5,471,441 | 11/1995 | Nonaka et al. | 369/47 |
| 5,521,900 | 5/1996 | Ando et al. | 369/275.1 |
| 5,543,925 | 8/1996 | Timmermans | 369/47 |
| 5,561,649 | 10/1996 | Lee et al. | 369/47 |
| 5,577,011 | 11/1996 | Jung | 369/47 |
| 5,619,483 | 4/1997 | Yokota et al. | 369/47 |
| 5,764,607 | 6/1998 | Maeda et al. | 369/47 |

OTHER PUBLICATIONS

Meyers et al. PCT/US92/09274 WO 93/09496, May, 1993.
Hara, Yoshiko "Sony Formats MD–Data", Electronic Engineering Times, p. 18., Jul. 1993.
"Optical Storage Briefs", Optical Information Systems Update, v. 8, n. 4., Mar. 1989.
"Sony Releases Add Backup Capability to CD–R Storage", Optical Memory News, N. 213, Jun. 1996.

Primary Examiner—Wayne Amsbury
Assistant Examiner—Charles L. Rones
Attorney, Agent, or Firm—Dickstein Shapiro Morin & Oshinsky LLP

[57] ABSTRACT

A recordable compact disc writing system in which a cause of system problems can be analyzed by referring to information with respect to a writing operation performed on the recordable compact disc. The recordable compact disc writing system writes data on the recordable compact disc. Management information with respect to a writing operation is recorded in a file created in a data storage device provided in the recordable compact disc writing system.

7 Claims, 5 Drawing Sheets

FIG. 5

```
                    MANAGEMENT INFORMATION

Y/M/D      Time      Event
  '96/06/28   1:31PM    Creating ApplSOSub file.
  '96/06/28   1:31PM    Sizing ISO file system data.
  '96/06/28   1:31PM    Writing ISO file system.
  '96/06/28   1:31PM    No possibility of underline.
  '96/06/28   1:31PM    Underline detection is ended.
  '96/06/28   1:31PM    Cession is empty.  No track exists.
  '96/06/28   1:31PM    Assigning track.  Data is 133 blocks.
                        CD has 250,640 empty blocks.
  '96/06/28   1:31PM    Write file system control track in
                        0x13334.  Length:0x85, Track
                        length:0x12c.
  '96/06/28   1:31PM    Copy data to target.
  '96/06/28   1:33PM    Buffer data is written.
  '96/06/28   1:33PM    Assigning track.  Data is 906 blocks.
                        CD has 244,986 empty blocks.
  '96/06/28   1:33PM    Error in writing.  Error:-36
  '96/06/28   1:33PM    Forcible track ending is unable.
  '96/06/28   1:33PM    Analyze error.
  '96/06/28   1:33PM    Recoverable error.  Recovery started.
  '96/06/28   1:33PM    Recovering 9660 control structure.
  '96/06/28   1:33PM    Start creating file system control
                        image.
  '96/06/28   1:34PM    Fill track. (to 300, from 133)
  '96/06/28   1:34PM    Buffer data is written.
  '96/06/28   1:34PM    Start verify of file system control
                        data.
  '96/06/28   1:34PM    Normal end of write and verify of
                        file system control track.
  '96/06/28   1:34PM    Normal end of write of file system
                        control image.
  '96/06/28   1:35PM    Normal end of write of file system
                        control track.
  '96/06/28   1:35PM    Error in creating ISO disc.
  '96/06/28   1:35PM    Cause: Forcible ending is unable.
  '96/06/28   1:35PM    Cause: SCSI command SynchCache
                        failed: Sense Key=0xb,
                        Additional Sense Code=0x50,0x00
  '96/06/28   1:35PM    Hex Sense Bytes: 70 00 0b 00 00 00
                        00 0a 00 00 00 00 50 00 00 00 00 00
  '96/06/28   1:35PM    Internal Error Code: 27, WRITE APPEND
                        ERROR
  '96/06/28   1:35PM    Cause: Write error to CD.
  '96/06/28   1:35PM    Cause: SCSI command write failed:
                        Sense Key=0x4, Additional Sense
                        Code=0xc2,0xa1
```

WRITING SYSTEM FOR A RECORDABLE COMPACT DISC STORING INFORMATION OF A WRITING OPERATION

BACKGROUND OF THE INVENTION

1. Field of the Invention

The present invention generally relates to a writing system for a recordable compact disc and, more particularly, to a writing system for a recordable compact disc which writes data supplied from a data storage device on the recordable compact disc.

2. Description of the related Art

A blank compact disc can record or write data thereon by a plurality of separate writing operations. Such a compact disc is generally referred to as a recordable compact disk (CD-R).

In a conventional writing system for the CD-R, a single data storage device is selected from which the data to be written on the CD-R is supplied. However, there are many cases in which the data to be written on a single CD-R is scattered into a plurality of data storage media such as a floppy disc, a magneto-optical disc and a hard disc.

Additionally, once a single device for driving one of the recording media has been selected, a different device cannot be selected until the writing operation for the CD-R is completed. Accordingly, it is not possible to write data on a single CD-R by gathering data from a plurality of different types of data storage media through interactive processing.

Generally, an audio compact disc (generally referred to as a CD) or a compact disc (generally referred to as a CD-ROM) used as a read only memory is produced on a mass production basis by a press using a master disc. This production method requires a large scale manufacturing facility, and, thus, the CD and the CD-ROM were not able to be produced on an individual user basis.

However, since the CD-R has been developed for use at a practical level, a user can easily produce an audio CD or a CD-ROM.

The physical format of the CD-R is defined in the Orange Book: Recordable Compact Disc System Description. An existing operating system (OS) for computer systems can be used as the logic format of the CD-R. The international standard for this format is the ISO standards 9660.

The format information of the CD-R includes a conversion table for converting a data format including a directory structure and a file name into a format of the CD-R to be used so that the data format of the data to be written on the CD-R conforms to the format of the CD-R.

In order to write data on the CD-R to produce a CD, a CD image is prepared. The CD image comprises a set of data to be written on the CD-R. The set of data is obtained from a data storage media such as a hard disc. The set of data is formatted in accordance with the logic format to be used in the writing operation. After the CD image is prepared, the CD image is supplied to the CD-R drive device as a single data stream. This is because the writing operation for the CD-R must be continuous from the beginning to the end due to the writing mechanism of the CD-R drive device.

It should be noted that the on-the-fly method is known as a writing method in which a part of the CD image is supplied to the CD-R drive device while the preparation of the CD image is being performed.

A digital audio CD (CD-DA) which records audio data and a CD-ROM which records digital data used by a computer are known and available on the market.

A description will now be given below of some terms used in this specification.

A "device" means a drive device for a floppy disc (FD), magneto-optical disc (MO), a hard disc (HD), and the like. The "CD-R drive device" is a device which writes data (CD image) on the CD-R or reads data recorded on the CD-R.

A "mastering" means recording or writing of data on a CD.

A "cession" is a unit of data to be written on a CD-R. The cession comprises a lead-in, a program area and a lead-out as shown in FIG. 1. The inner side of the lead-in is provided with a program memory area (PMA) in which data readable only by a CD-R drive device is recorded.

The lead-in is an area in which header information of the cession is recorded. The header information includes a starting address of each track, the number of tracks to be skipped, etc. The header information is recorded in the lead-in area shown in FIG. 1. A bad label, which is information for indicating a section to be skipped, is also recorded in the lead-in area.

The program area is an area in which the main data is recorded. The lead-out indicates the end of a cession.

The track is a unit for writing data in the cession. For example, if the data to be recorded is music data, a single track is used for a single tune or song.

The PMA is an area for recording information needed for writing the table of contents (TOC) in the lead-in area. The information includes, for example, information with respect to start and stop positions of a track.

The above-mentioned terms are generally used in the field related to a writing system for the recordable compact disc.

As discussed above, in the conventional system, the data to be written on the CD-R must be gathered and stored in a single data storage device since a plurality of devices cannot be selected in the conventional CD-R recording system. This data gathering operation is inconvenient for a user and takes time to prepare for the writing operation of the CD-R.

In order to eliminate the above-mentioned problems, the present applicant suggested in Japanese Laid-Open Patent Application No.8-147703 a recordable compact disc writing system comprising means for selecting a plurality of devices storing data to be written on a CD-R. According to this system, preparation of the CD image can be performed by using a plurality of data storage devices in a simple manner. Thus, a writing operation for a CD-R is simplified and speeded up.

However, in the system suggested by the above-mentioned patent document, if a writing operation is interrupted for some reasons such as system trouble, the recording operation cannot be resumed after the reason for the interruption has been eliminated. In this case, the writing operation must be started from the beginning with a new CD-R. Further, when such an interruption of writing operation occurs, there is no means for restoring the data that has already been written on the CD-R.

Additionally, this system does not provide for an analysis of system troubles or problems. That is, the system disclosed in the above-mentioned patent document cannot make a quick response to a system trouble or problem since this system cannot record or print out management information for the writing operation.

SUMMARY OF THE INVENTION

It is a general object of the present invention to provide an improved and useful recordable compact disc writing system in which the above-mentioned problems are eliminated.

A more specific object of the present invention is to provide a recordable compact disc writing system in which a cause of system troubles or problems can be analyzed by referring to information with respect to the writing operation performed on the recordable compact disc.

Another object of the present invention is to provide a recordable compact disc writing system which can provide information useful for recognizing a status of the system and analyzing problems or troubles in the system.

In order to achieve the above-mentioned objects, there is provided according to the present invention a recordable compact disc writing system for writing data on a recordable compact disc, the recordable compact disc writing system comprising:

writing means for writing the data on the recordable compact disc; and recording means for recording management information with respect to a writing operation performed by the writing means, the management information being recorded in a file created in a first data storage device provided in the recordable compact disc writing system.

According to the present invention, the management information is recorded in the file stored in the data storage device. Thus, a user or maintenance person can access the management information when it is necessary to manage or control the recordable compact disk writing system in case of an abnormal condition. The management information is helpful to the user or maintenance person to recover the system from the abnormal condition.

The management information recorded by the recording means may include history information of the writing operation. Additionally, the management information recorded by the recording means may include status information of the recordable compact disc writing system. Further, the management information recorded by the recording means may include error information with respect to an error occurring during the writing operation.

The recordable compact disc writing system according to the present invention may further comprise a plurality of second data storage devices each of which stores the data to be written on the recordable compact disc, and device selecting means for selecting at least one of the second data storage devices to be used.

The recordable compact disc writing system may further comprise data selecting means for selecting the data to be written from the data stored in the selected second data storage device.

Additionally, the writing means may comprise format information producing means for producing format information of the recordable compact disc in accordance with the data selected by the data selecting means; and formatting means for formatting the recordable compact disc in accordance with the format information before writing the data on the recordable compact disc.

The recordable compact disc writing system according to the present invention may further comprise printing means for printing the management information recorded by the recording means.

Additionally, the recordable compact disc recording system may further comprise indicating means for indicating the management information recorded by the recording means on a display unit.

Further, the recordable compact disc recording system may further comprise deleting means for deleting the management information from the file in the first data storage device.

Other objects, features and advantages of the present invention will become more apparent from the following detailed description when read in conjunction with the accompanying drawings.

BRIEF DESCRIPTION OF THE DRAWINGS

FIG.5 is an example of a printed output of the information recorded in the log file.

DETAILED DESCRIPTION OF THE PREFERRED EMBODIMENTS

Figure 1:
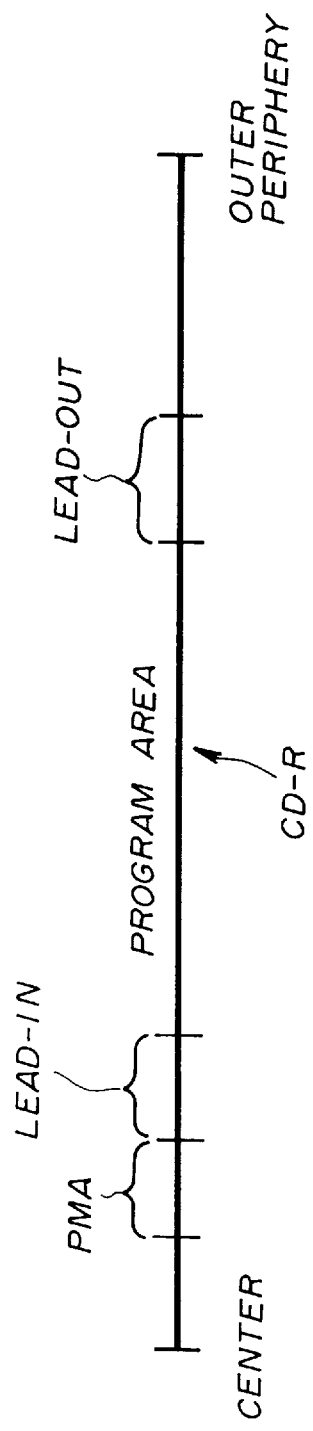
FIG.1 is an illustration for explaining recording areas provided on a recordable compact disc.
Figure 2:
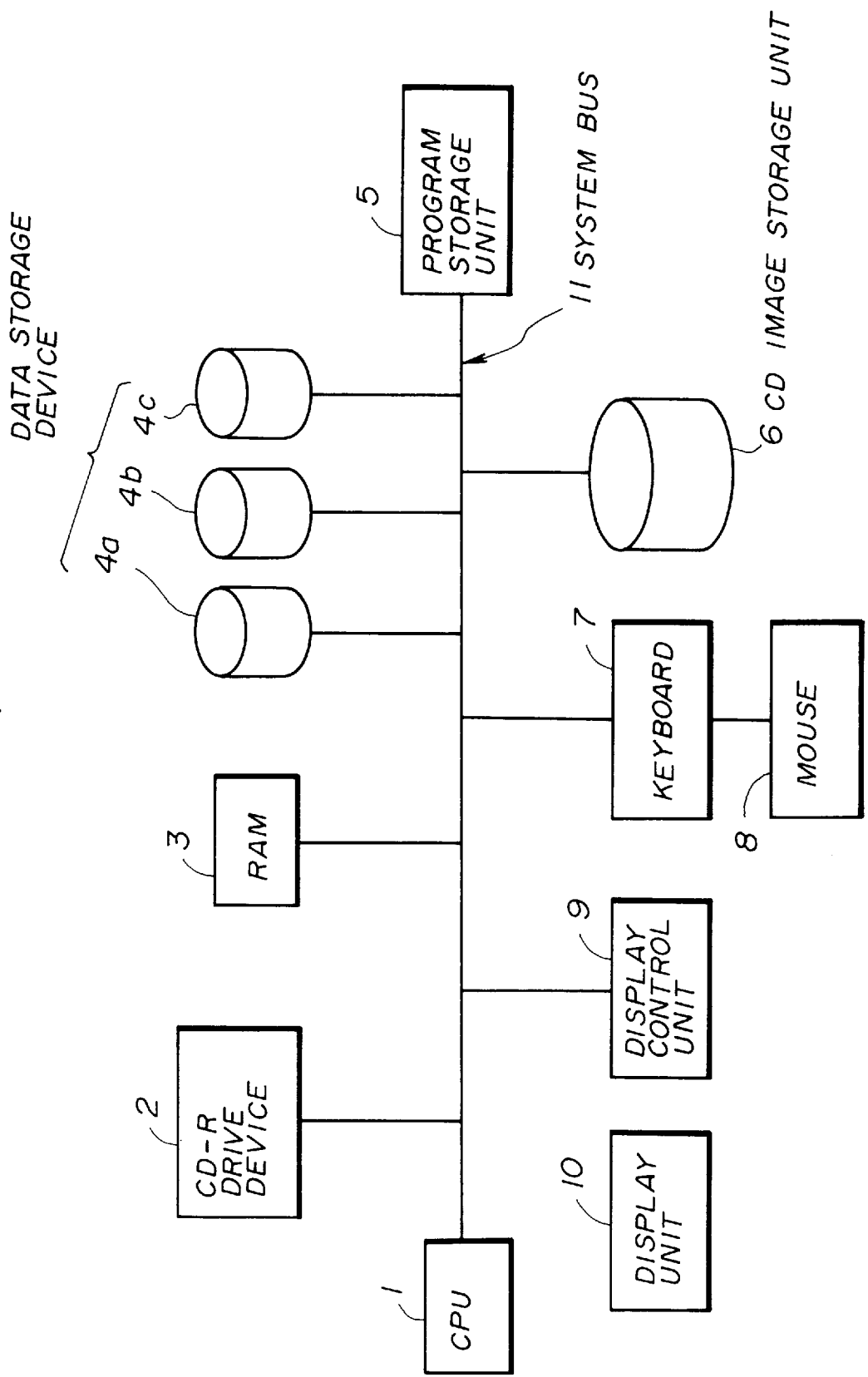
FIG.2 is a block diagram of a recordable compact disc writing system according to an embodiment of the present invention.

A description will now be given of an embodiment of the present invention. FIG.2 is a block diagram of a recordable compact disc writing system according to the embodiment of the present invention.

The recordable compact disc writing system shown in FIG.2 comprises a central processing unit (CPU) 1, a CD-R drive device 2, a RAM 3, data storage devices 4a, 4b and 4c, a program storage unit 5, a CD image storage unit 6, a keyboard 7, a mouse 8, a display control unit 9, a display unit 10 and a system bus.

The keyboard 7 and the mouse 8 are provided for inputting instructions and data to the system. An operator can input operational instruction for producing a recorded CD. Selection of the data storage devices is instructed through the keyboard 7 or the mouse 8. Selection and transfer of the data to be written is also instructed through the keyboard 7 or mouse 8.

The CPU 1 controls the entire system through the system bus 11 based on instructions input from the keyboard 7 or the mouse 8 and programs stored in the program storage unit 5. The CPU 1 also performs predetermined calculations and processes.

The CD-R drive device 2 performs a data transferring operation, a writing or recording operation on a CD-R and a reading or reproducing operation on a CD-R in accordance with instructions from the CPU 1. The CD-R drive device 2 itself has a CPU and a RAM (not shown in the figure) incorporated therein.

The RAM 3 stores information necessary for producing a recorded CD. The information includes, for example, information with respect to a selected one of the data storage devices 4a, 4b and 4c and information with respect to the data to be written which is selected from the data stored in the selected data storage device. The RAM 3 is also used as a storage means for producing a CD image when an instruction is sent to the CD-R drive device 2 to perform a writing or reading operation.

FIG.2 shows a case where three data storage devices 4a, 4b and 4c are provided in the system. Each of the data storage devices 4a, 4b and 4c stores data which will be written on a CD-R when the data is selected. It should be noted that any number of data storage devices can be provided in the system. A plurality of data storage devices can be selected by an instruction input through the keyboard 7 or the mouse 8.

The CD image storage unit 6, which may be a hard disk device, stores a CD image to be written on the CD-R to produce a desired CD. The CD image is transferred to the CD-R drive device 2 when the CD is produced by writing the CD image on a CD-R. The CD image storage unit 6 is also used to store management information with respect to a writing operation. The management information includes history information with respect to the writing operation, status information of the system and error information with respect to an error occurring during the writing operation. The management information is recorded in a log file created in the CD image storage unit 6.

The program storage device 5 stores programs for controlling the entire recordable compact disk writing system shown in FIG.2. The program storage device 5 also stores programs for producing a CD from a CD-R and programs for restoring data which is destroyed due to a system trouble or problem.

The display control unit 9 controls the display unit 10 which comprises a CRT or LCD so as to display information stored in the RAM 3 or images of windows and icons on the display unit 10.

A description will now be given, with reference to a flowchart of FIG.3, of a writing operation performed by the recordable compact disc writing system shown in FIG.2. The writing operation is controlled by the CPU 1.

Figure 3:
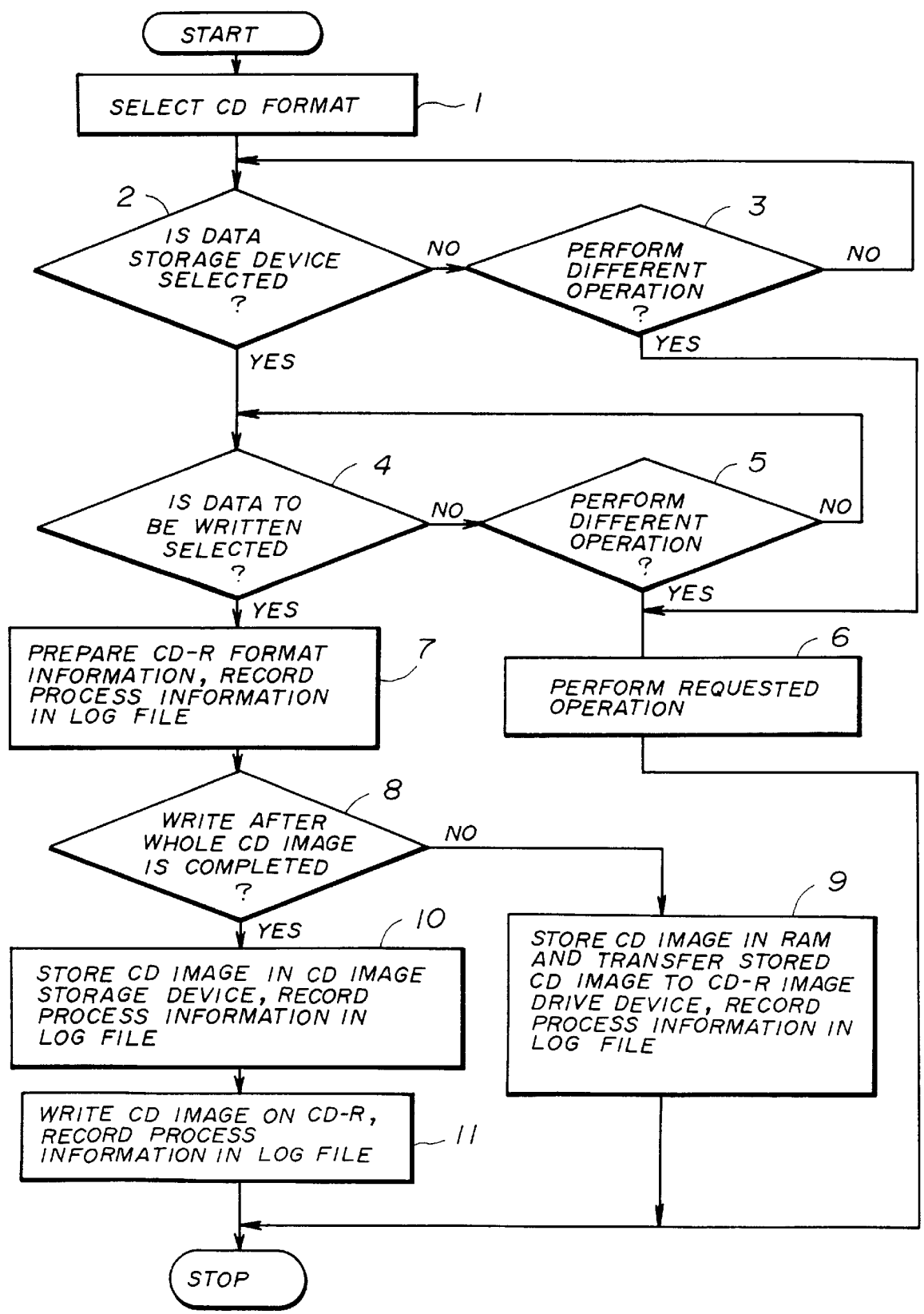
FIG.3 is a flowchart of a writing operation performed by the recordable compact disc writing system shown in FIG.2.

When the writing operation shown in FIG.3 is started, a format of the CD to be produced is selected in step 1. It is then determined, in step 2, whether or not at least one of the data storage devices 4a, 4b and 4c is selected. If it is determined that none of the data storage devices 4a, 4b and 4c is selected, the routine proceeds to step 3.

In step 3, it is determined whether or not a different operation is requested. If it is determined that a different operation is requested, the routine proceeds to step 6. In step 6, the requested operation is performed, and the routine is ended. If it is determined, in step 3, that no other operation is requested, the routine returns to step 2.

If it is determined, in step 2, that at least one of the data storage devices 4a, 4b and 4c is selected, the routine proceeds to step 4. In step 4, it is determined whether or not the data to be written on the CD-R is selected. If it is determined that the data to be written is not selected, the routine proceeds to step 5. In step 5, it is determined whether or not a different operation is requested.

If it is determined that a different operation is requested, the routine proceeds to step 6. In step 6, the requested operation is performed, and the routine is ended. If it is determined, in step 5, that no other operation is requested, the routine returns to step 4.

On the other hand, if it is determined, in step 4, that the data to be written is selected, the routine proceeds to step 7. In step 7, format information is prepared in accordance with the selected format and the selected data to be written. Additionally, information with respect to the process of step 7 is recorded in a log file stored in the CD image storage unit 6.

It is then determined, in step 8, whether or not the writing operation to the CD-R is performed after the preparation of the entire CD image to be written in this recording operation is completed. If it is determined that the writing operation is performed after the preparation of the entire CD image is completed, the routine proceeds to step 10.

In step 10, the entire CD image is stored in the CD image storage unit 6. Information with respect to the process of step 10 is recorded in the log file. Then, in step 11, the CD image is transferred to the CD-R drive device 2. Information with respect to the process of step 11 is recorded in the log file, and the routine is ended.

On the other hand, if it is determined, in step 8, that the CD image is written on a partial basis, that is, the writing operation to the CD-R and the preparation of the CD image should be performed concurrently, the routine proceeds to step 9. In step 9, the CD image produced in accordance with the CD-R format information is stored in the RAM 3. In this process, when a predetermined amount of the CD image is stored in the RAM 3, the stored CD image is transferred to the CD-R drive device 2 while preparation of the CD image is continued. Information with respect to the process of step 9 is recorded in the log file. The routine is ended after the whole CD image to be written is transferred to the CD-R drive apparatus 2 and written on the CD-R.

In the above-discussed writing operation, a desired CD is produced by using the CD-R while the management information with respect to the processes in the writing operation is recorded in the log file. A user or a maintenance person may accesses the log file when it is needed, for example, when a system problem has occurred, so as to check the status of the system or analyze the system problem or find a cause of the system problem.

A description will now be given, with reference to a flowchart of FIG.4, of a printing, indicating, deleting operation for the status information stored in the log file.

Figure 4:
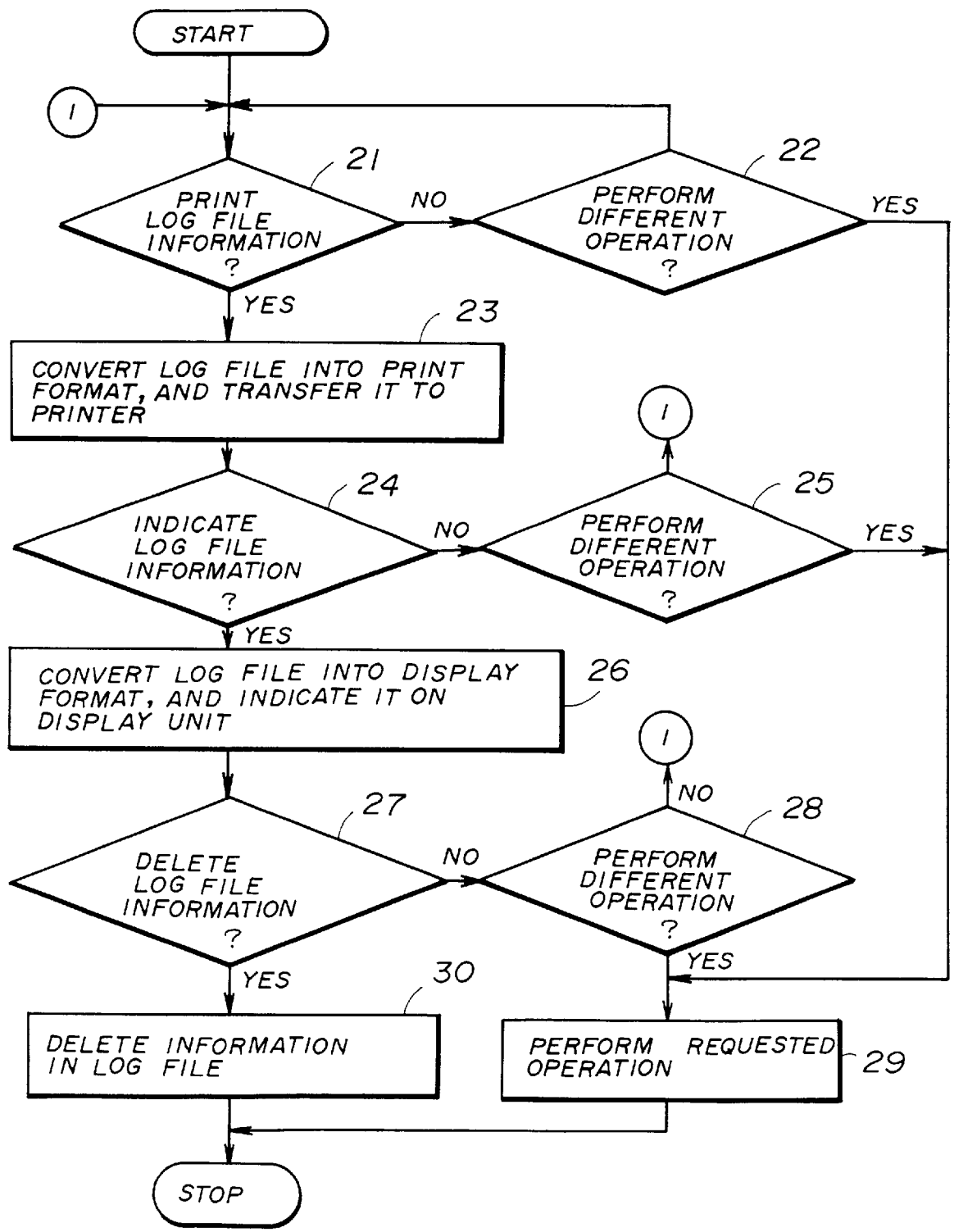
FIG.4 is a flowchart of a printing, indicating, deleting operation for information recorded in a log file.

When the operation shown in FIG.4 is started, it is determined, in step 21, whether or not the management information recorded in the log file is to be printed. If it is determined that a print of the management information is not requested, the routine proceeds to step 22. In step 22, it is determined whether or not a different operation is requested.

If it is determined that a different operation is requested, the routine proceeds to step 29 so as to perform the requested operation, and the routine is ended. If it is determined that no other operations are requested, the routine returns to step 21.

On the other hand, if it is determined, in step 21, that the management information in the log file is to be printed, the routine proceeds to step 23. In step 23, the format of the log file is converted into a print format, and the converted log file is transferred to a printer (not shown) so that the management information recorded in the log file is printed. FIG.5 is an illustration of an example of printed management information in the log file. As shown in FIG.5, the management information recorded in the log file includes history information of a writing operation, status information of the system and error information which indicates a cause and nature of error occurrence in the system. Each event for the management information is recorded with time information as shown in FIG.5.

It is then determined, in step 24, whether or not the management information in the log file is to be indicated on the display unit 10. If it is determined that the indication of the information in the log file is not requested, the routine proceeds to step 25. In step 25, it is determined whether or not a different operation is requested.

If it is determined that a different operation is requested, the routine proceeds to step 29 so as to perform the requested operation, and the routine is ended. If it is determined that no other operations are requested, the routine returns to step 21.

On the other hand, if it is determined, in step 24, that the indication of the management information in the log file is requested, the routine proceeds to step 26. In step 26, the format of the log file is converted into a display format, and the converted log file is displayed on the display unit 10.

It is then determined, in step 27, whether or not the management information in the log file is to be deleted. If it is determined that the management information in the log file is not to be deleted, the routine proceeds to step 28. In step 28, it is determined whether or not a different operation is requested.

If it is determined that a different operation is requested, the routine proceeds to step 29 so as to perform the requested operation, and the routine is ended. If it is determined that no other operations are requested, the routine returns to step 21.

On the other hand, if it is determined, in step 27, that deletion of the information in the log file is requested, the routine proceeds to step 30. In step 30, the management information in the log file is deleted in accordance with a file operation function provided in the operating system.

In the above-mentioned operation, the requests or instructions for print, indication or deletion can be input by a user through the keyboard 7 or the mouse 8. Accordingly, the user can output the management information of a recording operation when the writing operation is interrupted for some reasons such as a system trouble or problem. This helps the user to find a cause of the system trouble or problem and to restore the data to be written on the CD-R that was being written.

The present invention is not limited to the specifically disclosed embodiment, and variations and modifications may be made without departing from the scope of the present invention.

What is claimed is:

1. A recordable compact disc writing system for writing data on a recordable compact disc, said recordable compact disc writing system comprising:

writing means for writing the data on said recordable compact disc;

recording means for recording management information with respect to a writing operation performed by said writing means, the management information being recorded in a file created in a first data storage device provided in said recordable compact disc writing system;

a plurality of second data storage devices each of which stores the data to be written on said recordable compact disc;

device selecting means for selecting at least one of said second data storage devices to be used;

data selecting means for selecting the data to be written from the data stored in the selected second data storage device;

format information producing means for producing format information of said recordable compact disc in accordance with the data selected by said data selecting means; and formatting means for formatting said recordable compact disc in accordance with the format information prior to writing the data on said recordable compact disc.

2. The recordable compact disc writing system as claimed in claim 1, wherein the management information recorded by said recording means includes history information of the writing operation.

3. The recordable compact disc writing system as claimed in claim 1, wherein the management information recorded by said recording means includes status information of said recordable compact disc writing system.

4. The recordable compact disc writing system as claimed in claim 1, wherein the management information recorded by said recording means includes error information with respect to an error occurring during the writing operation.

5. The recordable compact disc writing system as claimed in claim 1, further comprising printing means for printing the management information recorded by said recording means.

6. The recordable compact disc recording system as claimed in claim 1, further comprising indicating means for indicating the management information recorded by said recording means on a display unit.

7. The recordable compact disc recording system as claimed in claim 1, further comprising deleting means for deleting the management information from said file in said first data storage device.

* * * * *